United States Patent [19]

Sloan, Jr.

[11] Patent Number: 5,420,370
[45] Date of Patent: May 30, 1995

[54] METHOD FOR CONTROLLING CLATHRATE HYDRATES IN FLUID SYSTEMS

[75] Inventor: Earle D. Sloan, Jr., Golden, Colo.

[73] Assignee: Colorado School of Mines, Golden, Colo.

[21] Appl. No.: 979,588

[22] Filed: Nov. 20, 1992

[51] Int. Cl.$^6$ .............. F17D 1/05; C07C 7/20
[52] U.S. Cl. ....................... 585/15; 585/950; 166/310; 166/371; 137/3; 137/13
[58] Field of Search .................. 166/310, 371; 137/3, 137/13; 252/8.551; 585/950, 15

[56] References Cited

U.S. PATENT DOCUMENTS

| | | | |
|---|---|---|---|
| 2,115,823 | 5/1938 | Miller et al. | 87/9 |
| 3,096,383 | 7/1963 | Hann | 585/950 |
| 3,213,593 | 10/1965 | Hendrix | 585/15 |
| 3,348,614 | 10/1967 | Sinclair et al. | 166/310 |
| 3,644,107 | 2/1972 | Clark | 585/950 |
| 3,857,686 | 12/1974 | Arnold et al. | 55/29 |
| 3,962,110 | 6/1976 | Tate | 252/181 |
| 4,132,535 | 1/1979 | Rivers, Jr. et al. | 55/23 |
| 4,456,067 | 6/1984 | Pinner, Jr. | 166/279 |
| 4,556,499 | 12/1985 | Heier et al. | 252/51.5 |
| 4,597,779 | 7/1986 | Diaz | 166/267 |
| 4,792,412 | 12/1988 | Heilweil | 252/8.514 |
| 4,856,593 | 8/1989 | Matthews et al. | 106/310 |
| 4,915,176 | 4/1990 | Sugier et al. | 166/371 |
| 4,973,775 | 11/1990 | Sugier et al. | 585/15 |
| 5,055,178 | 10/1991 | Sugier et al. | 208/188 |
| 5,076,364 | 12/1991 | Hale et al. | 252/8.551 |
| 5,127,231 | 7/1992 | Larue et al. | 62/20 |
| 5,244,878 | 9/1993 | Sugier et al. | 507/90 |

FOREIGN PATENT DOCUMENTS

| | | | |
|---|---|---|---|
| 318784 | 11/1974 | Austria. | |
| 612901 | 1/1961 | Canada | 166/310 |
| 1168427 | 6/1984 | Canada. | |
| 0457375A1 | 11/1991 | European Pat. Off.. | |
| 2618876 | 2/1989 | France. | |
| 1282946 | 7/1972 | United Kingdom. | |
| 1339235 | 9/1987 | U.S.S.R. | 166/310 |

*Primary Examiner*—Helen M. S. Sneed
*Assistant Examiner*—Walter D. Griffin
*Attorney, Agent, or Firm*—Sheridan Ross & McIntosh

[57] ABSTRACT

Discussed is a process for preventing clathrate hydrate masses from impeding the flow of fluid in a fluid system. An additive is contacted with clathrate hydrate masses in the system to prevent those clathrate hydrate masses from impeding fluid flow. The process is particularly useful in the natural gas and petroleum production, transportation and processing industry where gas hydrate formation can cause serious problems. Additives preferably contain one or more five member and/or six member cyclic chemical groupings. Additives include poly(N-vinyl-2-pyrrolidone) and hydroxyethylcellulose, either in combination or alone.

13 Claims, No Drawings

METHOD FOR CONTROLLING CLATHRATE HYDRATES IN FLUID SYSTEMS

FIELD OF THE INVENTION

The present invention involves a method for controlling problems that can be caused by clathrate hydrates, and particularly by gas hydrates, in fluid systems.

BACKGROUND OF THE INVENTION

Clathrate hydrates are crystalline compounds which occur when water forms a cage-like structure around guest molecules. Clathrate hydrates, especially in the hydrocarbon industry, are often referred to as gas hydrates, or simply as hydrates. Gas hydrates of interest to the hydrocarbon industry, particularly with respect to producing, transporting, and processing of natural gas and petroleum fluids, are composed of water and the following eight guest molecules: methane, ethane, propane, isobutane, normal butane, nitrogen, carbon dioxide, and hydrogen sulfide. Other guest molecules capable of forming clathrate hydrates, although not normally of significant interest to the hydrocarbon industry, include ethane, nitrous oxide, acetylene, vinyl chloride, methyl bromide, ethyl bromide, cyclopropane, methyl mercaptan, sulfur dioxide, argon, krypton, oxygen, xenon, trimethylene oxide, and others. Clathrate hydrate formation is a possibility any place water exists in the vicinity of such molecules, both naturally and artificially, at temperatures above 32° F. and below 32° F. when the pressure is elevated.

It is primarily due to their crystalline, insoluble, non-flowing nature that hydrates have been of interest to industry. They have been considered a nuisance, because they block transmission lines, plug Blow Out Preventors, jeopardize the foundations of deepwater platforms and pipelines, collapse tubing and casing, and foul process heat exchangers and expanders. Common examples of preventive measures are found in the regulation of pipeline water content, unusual drilling mud compositions, and large quantities of methanol injection into pipelines.

Hydrates normally form in one of two small, repeating crystal structures. Structure I (sI), a body-centered cubic structure, forms with natural gases containing molecules smaller than propane. Structure II (sII), a diamond lattice within a cubic framework, forms when natural gases or oils contain molecules larger than ethane but smaller than pentane; this structure represents hydrates which commonly occur in hydrocarbon production and processing conditions. Also, at least one other repeating crystal structure is known to exist, and additional structures theoretically could exist.

The structures of both sI and sII are given with reference to a water molecule skeleton, in which guest molecules are encaged, composed of a basic "building block" cavity which has twelve pentagonal faces given the abbreviation $5^{12}$. By linking the vertices of $5^{12}$ cavities one obtains sI, while linking the faces of $5^{12}$ cavities results in sII. The regions between the linked $5^{12}$ cavities in repeating crystal structures are larger cavities which contain twelve pentagonal faces and either two or four hexagonal faces: $5^{12}6^2$ for sI and $5^{12}6^4$ for sII. The water molecules of a cavity are held in place by hydrogen bonds, which attach water molecules to each other to form the cavity. Inside each cavity resides a maximum of one guest molecule. Cavities other than the $5^{12}, 5^{12}6^2$, and $5^{12}6^4$ cavities, just described, could exist in repeating crystal structures other than sI and sII. Any cavity, however, should have exactly twelve pentagonal faces. Additional information concerning clathrate hydrates, and particularly gas hydrates, can be found in Sloan, *Clathrate Hydrates of Natural Gases*, M. Dekker, N.Y., 1990, the contents of which is incorporated herein in its entirety.

There are four common means of inhibiting formation of or dissociating hydrates, namely: 1) removing one of the components, either the guest molecule or water, 2) heating the system beyond the hydrate formation temperature at a given pressure, 3) decreasing the system pressure below hydrate stability at a given temperature, and 4) injecting an inhibitor such as methanol or glycol to decrease hydrate stability conditions so that higher pressures and lower temperatures are required for hydrate stability. The above four common techniques are termed thermodynamic inhibition, because they remove the system from thermodynamic stability, by changes in composition, temperature, or pressure. While the system is kept outside thermodynamic stability conditions, hydrates can never form.

In U.S. Pat. No. 4,915,176 by Sugier et al., issued Apr. 10. 1990, a method is proposed for transporting a fluid under conditions at which hydrates are allowed to form. That patent discusses the use of amphophilic compounds, having a hydrophilic part and an lipophilic part, which are mixed with a fluid to be transported to lower the gas hydrate formation temperature and/or to modify the mechanism of formation of such hydrates. It is reported that such compounds disperse the gas hydrates in the fluid and then prevent their agglomeration. However it is believed that the chemicals used in this process are expensive and could require extensive recycling to be economical. It is also believed that the process would not be effective in a fluid system containing a continuous aqueous liquid phase, that is, for example, an aqueous liquid phase that is not dispersed throughout a continuous organic liquid phase such as in a water-in-oil type emulsion. Therefore, that process would not be effective, for example, in a fluid system containing both a gaseous and an aqueous liquid phase, but containing no organic liquid phase, or a fluid system comprising significantly more aqueous liquid phase than organic liquid phase.

From the foregoing, it appears that there is a need for new methods to address clathrate hydrate problems in fluid systems, particularly those encountered in producing, transporting, and processing petroleum and natural gas fluids.

SUMMARY OF THE INVENTION

One object of the present invention is to provide a process for preventing clathrate hydrate masses in a fluid stream from impeding flow of the fluid stream, particularly with respect to fluid streams encountered in the hydrocarbon industry such as with the production, transportation and processing of petroleum and natural gas fluids.

Another object is to provide an economical process for preventing clathrate hydrate problems in fluid systems.

Another object is to provide additives for use in controlling clathrate hydrates in fluid systems, which additives have low toxicity and, therefore, their use is environmentally desirable.

Another object of the invention is to provide a process for preventing clathrate hydrate masses from agglomerating to form large masses in fluid systems containing a continuous aqueous liquid phase.

According to the present invention, an additive is added to a fluid system to prevent clathrate hydrate masses that are present, or that form, in a fluid system from agglomerating or otherwise growing to form clathrate hydrate masses that would be large enough to create problems in the fluid system, such as by impeding the flow of fluids. Preferably, clathrate hydrate masses in a fluid system are prevented from forming masses larger than a repeating crystal structure, and more preferably from forming masses as large as a repeating crystal structure. In particular, it is believed that the additive interacts with clathrate hydrate cavities of clathrate hydrate masses in a way that prevents those cavities from participating in the formation of larger clathrate hydrate masses.

In one embodiment, clathrate hydrate masses are prevented from impeding the flow of a fluid stream by the addition of an additive comprising poly(N-vinyl-2-pyrrolidone) to the fluid system. In another embodiment the additive comprises hydroxyethylcellulose.

In another embodiment, an additive comprising at least one five member cyclic chemical grouping and/or six member cyclic chemical grouping is applied to the fluid stream to prevent clathrate masses from impeding the flow and, more specifically, it is believed, to interfere with the process by which smaller clathrate hydrate masses form larger clathrate hydrate masses.

In another embodiment, clathrate hydrate masses are prevented from impeding the flow of a fluid stream by application of an additive that has a molecular weight greater than about 3,000.

According to the present invention, The fluid system may comprise, in addition to clathrate hydrate masses, any combination and relative proportions of a gaseous phase, an aqueous liquid phase, and an organic liquid phase. In one embodiment, the fluid system comprises an aqueous liquid phase and a gaseous phase. In another embodiment, the fluid system comprises a fluid stream that is transported by flow through a conduit. In another embodiment, the fluid system comprises one or more fluid phases from the production, transportation or processing of natural gas or petroleum fluids.

DETAILED DESCRIPTION OF THE INVENTION

In one respect, the present invention involves controlling the joining together of clathrate hydrate masses in fluid systems to form larger clathrate hydrate masses. The present invention also involves controlling the formation of clathrate hydrates in a fluid system to prevent large clathrate hydrate agglomerates in a fluid system. A fluid stream having clathrate hydrate masses mixed therein, or that is susceptible to the formation of clathrate hydrate masses, is contacted with an additive that prevents clathrate hydrate masses from forming a mass or masses that could impede the flow of the fluid stream. Preferably, clathrate hydrate masses no larger than a repeating crystal structure are allowed to form. More preferably, no clathrate hydrate masses become as large as a repeating crystal structure. Preferably, the additive is soluble in water.

The present invention is particularly useful in the hydrocarbon industry such as with the production, transportation and processing of natural gas and petroleum. The present invention is useful, for example, to control gas hydrates that could form during extraction of natural gas and petroleum fluids through a producing well, during transportation of the extracted fluids, and during processing of the extracted fluids.

Preferably, the additive comprises at least one cyclic chemical grouping, also known as a ring grouping, in its molecular structure, and more preferably, the additive comprises a plurality of cyclic chemical groupings, which can be either the same or different from one another. A cyclic chemical grouping refers to an organic ring structure, which may contain only carbon atoms as members of the ring, or may contain one or more other atoms in the ring such as, for example, oxygen, nitrogen, sulfur, and phosphorus atoms. Preferably, the cyclic grouping has a polar grouping, which is either a polar atom, such as oxygen or nitrogen, in the ring, or a polar substituent, such as an oxygen atom, attached to the ring, or both.

It is particularly preferred that the additive comprise at least one five member cyclic chemical grouping and/or one six member cyclic chemical grouping in its molecular structure. Most preferably, the additive comprises at least one five member cyclic chemical grouping in its molecular structure.

Although not wishing to be bound by theory, it is believed that when guest molecules, such as those in natural gases, dissolve in water and form clathrate hydrates, that water molecules cluster around the guest molecule, in a labile, non-permanent structure which closely resembles the $5^{12}$ cavity. Two or more of these water clusters have been shown to share either vertices or faces, in the beginning of hydrate crystallization.

It is therefore possible to prevent clathrate hydrates from plugging, or otherwise impeding the flow of fluids by using a kinetic growth inhibitor to block small fluid-like species from becoming larger crystalline species.

The method of inhibition according to the process of the present invention, called kinetic inhibition, allows the system to exist in the hydrate thermodynamic stability region, but small hydrates nuclei are hindered form agglomerating to larger masses by means of small quantities of new chemicals. It is believed that five member cyclic chemical structures are particularly useful because they interact with one more of the pentagonal faces of a cavity, thereby preventing those pentagonal faces from participating in the formation of a larger clathrate hydrate mass.

Preferably, the additive is a polymer of molecular weight greater than about 3,000 and more preferably of molecular weight greater than about 20,000.

One substance that has been found to be particularly effective, and is therefore particularly preferred as an additive, is Poly(N-vinyl-2-pyrrolidone), which comprises a plurality of five member cyclic groupings extending from a polymer backbone. Preferably, such poly(N-vinyl-2-pyrrolidone) is of molecular weight greater than about 3,000 and more preferably greater than about 20,000. Poly(N-vinyl-2-pyrrolidone) is a chemical with low toxicity. Therefore, it would not cause significant environmental damage if accidentally released into the environment, such as might occur in case of a pipeline leak.

Another preferred addition is hydroxyethylcellulose, which comprises six membered as well as five membered cyclic chemical groupings. In one particularly preferred embodiment, the additive comprises both poly(N-vinyl-2-pyrrolidone) and hydroxyethylcellulose.

The fluid system comprises any fluid or fluids comprising water and guest molecules, which water and guest molecules together can form clathrate hydrates. The fluid system may comprise any combination of one or more gaseous phase, aqueous liquid phase, and organic liquid phase, and in any proportions. Typically, the fluid system will comprise at least two fluid phases, a gaseous phase, which comprises guest molecules, and an aqueous liquid phase. Typically, a suitable fluid system comprising an organic liquid phase also comprises both a gaseous phase and an aqueous liquid phase.

The present invention is particularly useful in fluid systems comprising a continuous aqueous liquid phase. A continuous aqueous liquid phase is, for example, an aqueous phase that is not dispersed as small, emulsified droplets throughout a continuous organic phase, as would be the case in a water-in-oil type emulsion. Therefore, the present invention is particularly useful, for example, when the fluid system comprises a gaseous phase and an aqueous liquid phase in the absence of an organic liquid phase, or at least in the absence of an organic liquid phase of significant volumetric proportion relative to the aqueous liquid phase. It has been surprisingly discovered that, according to the present invention, clathrate hydrate masses in such a fluid system, containing a continuous aqueous liquid phase will nonetheless disperse in the fluid system, and in particular will disperse in the continuous aqueous liquid phase, and will not agglomerate to form a mass large enough to impede the flow of a fluid stream comprising the dispersed clathrate hydrate masses. This is particularly surprising because, in the absence of a substantial organic liquid phase, the aqueous liquid phase cannot be emulsified and dispersed throughout the organic phase to maintain dispersion of clathrate hydrates forming in small, dispersed aqueous droplets.

With the present invention, it is not necessary to disperse an aqueous liquid phase, such as throughout an organic liquid phase, to prevent agglomeration of clathrate hydrate masses. With the present invention, even in a fluid system that contains a shortage of available water relative to available guest molecules for the formation of clathrate hydrates, not all of the water will participate with guest molecules to form clathrate hydrates. Rather, free water will typically remain in an aqueous liquid phase, which will have clathrate hydrate masses dispersed therein.

Based on the foregoing, it will be recognized that the present invention has wide applicability to fluid systems of varying relative proportions of gaseous, aqueous liquid, and organic liquid phases. The present invention, for example, will disperse clathrate hydrates in an aqueous phase, whether such aqueous phase is in a gas/aqueous liquid system or in a gas/aqueous liquid/organic liquid system. Also, in a gas/aqueous liquid/organic liquid system, it is not necessary that the organic liquid phase predominates over the aqueous liquid phase because it is not necessary to disperse the aqueous phase as small droplets in an emulsified form.

Contacting an additive with clathrate hydrates in a fluid system, according to the present invention, can be accomplished using any suitable contacting means. For example, such contacting can be effected by mixing an additive into the fluid system, such as into a flowing fluid stream. For example, an additive could be injected into a downhole location in a producing well to control clathrate hydrates in fluids being produced through that well. Likewise, an additive could, for example, be injected into the produced fluid stream at a wellhead location, or even into piping extending through a riser, through which produced fluids are transported in offshore producing operations from the ocean floor to the offshore producing facility located at or above the surface of the water. Also, an additive could be injected into a fluid stream prior to transporting that fluid stream, such as by injecting an additive into the fluid stream which is then transported, such as via subsea pipeline from an offshore producing location to an onshore processing facility.

Additives useful according to the present invention, can be normally solid, normally liquid, or normally gaseous. If such additive is normally solid, such as is the case with many polymers, including poly(N-vinyl-2-pyrrolidone), such solid additive is preferably dissolved into a carrier liquid, so that the additive can then be injected into the fluid system in liquid form. For example, poly(N-vinyl-2-pyrrolidone), and/or hydroxyethylcellulose, can be dissolved in methanol, and the methanol solution can then be injected directly into a flowing fluid stream to affect a desired contacting of the additive with clathrate hydrate masses that may form in the fluid stream during transportation, such as through a pipeline. The carrier liquid should preferably be soluble in water. Water, however, is generally not preferred as a carrier liquid because of the tendency of such water to promote additional clathrate hydrate formation in the fluid system.

Preferably, an additive is mixed with the fluid system prior to the formation of clathrate hydrates in that fluid system. The additive would then be present in the fluid system to contact clathrate hydrate masses as they first form.

Mixing of an additive into the fluid system, or contacting of an additive already in the fluid system with clathrate hydrate masses, may be aided by mechanical means, as are well known in the art, such as, for example, by using conveniently located static, in-line mixers on a pipeline. In most pipeline transportation applications, however, sufficient mixing and contacting will occur due to the turbulent nature of the fluid flow and mechanical mixing aids will not be required.

It will be recognized that the amount of additive required to be added to any particular fluid system will depend upon the composition of that system and the conditions of temperature and pressure to which the fluid system will be subjected. Generally, however, such additive will be added in an amount that results in from about 0.2% to about 0.5%, by weight, of additive relative to free water in a fluid system.

The following examples are provided for the purpose of illustrating the present invention and are not intended to limit the scope of the invention in any way.

Example 1

This example is provided for comparison, and illustrates the formation of clathrate hydrates in an aqueous solution and growth of those clathrate hydrates into masses of sufficient size to form a clathrate hydrate plug in a fluid system.

A 15 ml test tube is filled with an aqueous solution containing 3.5 weight percent sodium chloride, relative to water, and 20 weight percent of tetrahydrofuran, also relative to water. Tetrahydrofuran is a compound capable of forming a clathrate hydrate. A stainless steel ball having an outside diameter of 0.20 inch is inserted into the test tube so that the ball can roll freely along the tube length. The test tube is sealed and placed in a water bath containing ice that is at a temperature of 0° C. A mechanical device rotates the test tube continuously end-over-end about the center point of the length of the test tube. The stainless steel ball rolls from one end of the test tube to the other during each rotation of the test tube. The test tube is visually observed while rotating in such a fashion.

The solution becomes cloudy, indicating the initiation of a clathrate hydrate phase within the tube, after about twelve minutes of rotating in the water bath. After approximately thirty minutes of rotating in the water bath, the ball completely stops rolling in the test tube, indicating that clathrate hydrates have formed a plug within the test tube.

EXAMPLE 2

This example illustrates the use of an additive to prevent aggregation of clathrate hydrates in an aqueous solution to form a clathrate hydrate plug.

The experimental procedure of Example 1 is repeated, except that poly(N-vinyl-2-pyrrolidone) is added to the aqueous solution in an amount of 0.5 percent by weight, relative to water. The solution in the test tube becomes cloudy after approximately 45 minutes of rotating in the water bath. After 6 hours of rotating in the water bath, the ball is still rolling. Normally, even if this experiment is continued after 6 hours, the ball continues to roll in the test tube even after a period of 24 hours. Therefore, the additive prevents the formation of a clathrate hydrate plug in the test tube over what is believed to be a commercially significant period of time.

While various embodiments of the present invention have been described in detail, it is apparent that modifications and adaptations of those embodiments will occur to those skilled in the art. It is to be expressly understood, however, that such modifications and adaptations are within the scope of the present invention, as set forth in the following claims.

What is claimed is:

1. A method for preventing first clathrate hydrate masses in a fluid stream from forming a second clathrate hydrate mass that could impede the flow of the fluid stream, the method comprising the steps of:
    (a) providing a flowable fluid stream comprising first clathrate hydrate masses and at least one fluid comprising water, each of said first clathrate hydrate masses comprising at least one cavity, each of said cavities comprising an ordered arrangement of water molecules that enclose at most one guest molecule, said at most one guest molecule being a molecule other than water, each of said first clathrate hydrate masses being no larger than a mass of a repeating crystal structure of cavities, such a repeating crystal structure, in combination with other repeating crystal structures, being capable of forming a second clathrate hydrate mass that could impede the flow of said fluid stream;
    (b) flowing said fluid stream from a first location to a second location that is distant from said first location; and
    (c) contacting at least a portion of said first clathrate hydrate masses with an additive to prevent said first clathrate hydrate masses from agglomerating in said fluid stream and thereby preventing formation of said second clathrate hydrate mass between said first location and second location, wherein said additive comprises poly(N-vinyl-2-pyrrolidone).

2. The method of claim 1, wherein said poly(N-vinyl-2-pyrrolidone) has a molecular weight greater than about 20,000.

3. A method for preventing first clathrate hydrate masses in a fluid stream from forming a second clathrate hydrate mass that could impede the flow of the fluid stream, the method comprising the steps of:
    (a) providing a flowable fluid stream comprising first clathrate hydrate masses and at least one fluid comprising Water, each of said first clathrate hydrate masses comprising at least one cavity, each of said cavities comprising an ordered arrangement of water molecules that enclose at most one guest molecule, said at most one quest molecule being a molecule other than water, each of said first clathrate hydrate masses being no larger than a mass of a repeating crystal structure of cavities, such a repeating crystal structure, in combination with other repeating crystal structures, being capable of forming a second clathrate hydrate mass that could impede the flow of said fluid stream;
    (b) flowing said fluid stream from a first location to a second location that is distant from said first location; and
    (c) contacting at least a portion of said first clathrate hydrate masses with an additive to prevent said first clathrate hydrate masses from agglomerating in said fluid stream and thereby preventing formation of said second clathrate hydrate mass between said first location and second location, wherein said additive comprises hydroxyethylcellulose.

4. A method for preventing first clathrate hydrate masses in a fluid stream from forming a second clathrate hydrate mass that could impede the flow of the fluid stream, the method comprising the steps of:
    (a) providing a flowable fluid stream comprising first clathrate hydrate masses and at least one fluid comprising water, each of said first clathrate hydrate masses comprising at least one cavity, each of said cavities comprising an ordered arrangement of water molecules that enclose at most one guest molecule, said at most one guest molecule being a .molecule other than water, such first clathrate hydrate masses capable of forming a second clathrate hydrate mass that could impede the flow of said fluid stream;
    (b) flowing said fluid stream from a first location to a second location that is distant from said first location; and
    (c) contacting at least a portion of said first clathrate hydrate masses with an additive to prevent said first clathrate hydrate masses from agglomerating in said fluid stream and thereby preventing formation of said second clathrate hydrate mass between said first location and second location, said additive comprising a polymer having at least one cyclic chemical grouping and having a molecular weight greater than about 20,000.

5. A method for transporting a fluid stream, the method comprising:
    (a) providing a flowable fluid stream comprising clathrate hydrate masses, a gaseous phase, and an aqueous liquid phase comprising free water, each of said clathrate hydrate masses comprising at least one clathrate hydrate cavity, each of said clathrate hydrate cavities comprising an ordered arrangement of water molecules that enclose at most one guest molecule, said at most one guest molecule being a molecule other than water, said gaseous phase comprising unreacted guest molecules, said unreacted quest molecules being guest molecules that have not been enclosed by and captured within a clathrate hydrate cavity, said unreacted quest molecules being present in said gaseous phase in excess relative to free water in said aqueous liquid phase assuming combination of all of said unreacted guest molecules with free water to form clathrate hydrates;

(b) flowing said fluid stream from a first location to a second location that is distant from said first location; and (c) contacting said fluid stream with an additive to prevent at least a portion of said free water from combining with said unreacted quest molecules to form clathrate hydrates between said first location and said second location, wherein said additive comprises hydroxyethylcellulose.

6. A method for transporting a fluid stream, the method comprising:

(a) providing a flowable fluid stream comprising clathrate hydrate masses, a gaseous phase, and an aqueous liquid phase comprising free water, each of said clathrate hydrate masses comprising at least one clathrate hydrate cavity, each of said clathrate hydrate cavities comprising an ordered arrangement of water molecules that enclose at most one quest molecule, said at most one quest molecule being a molecule other than water, said gaseous phase comprising unreacted quest molecules, said unreacted quest molecules being guest molecules that have not been enclosed by and captured within a clathrate hydrate cavity, said unreacted quest molecules being present in said gaseous phase in excess relative to free water in said aqueous liquid phase assuming combination of all of said unreacted quest molecules with free water to form clathrate hydrates;

(b) flowing said fluid stream from a first location to a second location that is distant from said first location; and (c) contacting said fluid stream with an additive to prevent at least a portion of said free water from combining with said unreacted guest molecules to form clathrate hydrates between said first location and said second location, wherein said additive comprises poly(N-vinyl-2-pyrrolidone).

7. A method for preventing the agglomeration of clathrate hydrate masses in an aqueous liquid, the method comprising the steps of:

(a) providing a fluid stream comprising an aqueous liquid phase, said aqueous liquid phase having clathrate hydrate masses mixed therein, each of said clathrate hydrate masses comprising at least one cavity, each of said cavities comprising an ordered arrangement of water molecules that enclose at most one quest molecule, said at most one guest molecule being a molecule other than water; and (b) contacting said aqueous liquid phase having said clathrate hydrate masses mixed therein with an additive to prevent at least a portion of said clathrate hydrate masses from agglomerating with one another, wherein said additive comprises hydroxyethylcellulose.

8. A method for preventing the agglomeration of clathrate hydrate masses in an aqueous liquid, the method comprising the steps of:

(a) providing a fluid stream comprising an aqueous liquid phase, said aqueous liquid phase having clathrate hydrate masses mixed therein, each of said clathrate hydrate masses comprising at least one cavity, each of said cavities comprising an ordered arrangement of water molecules that enclose at most one guest molecule, said at most one quest molecule being a molecule other than water; and (b) contacting said aqueous liquid phase having said clathrate hydrate masses mixed therein with an additive to prevent at least a portion of said clathrate hydrate masses from agglomerating with one another, wherein said additive comprises poly(N-vinyl-2-pyrrolidone).

9. A method for transporting a fluid stream, the method comprising:

(a) providing a fluid stream;

(b) flowing said fluid stream from a first location to a second location that is distant from said first location under conditions at which it is thought that clathrate hydrate masses could exist in said fluid stream, said clathrate hydrate masses comprising water and at least one guest molecule; and (c) contacting said fluid stream with an additive for the purpose of preventing clathrate hydrate masses from impeding the flow of said fluid stream, said additive comprising at least one five member cyclic chemical grouping, wherein said additive comprises poly(N-vinyl-2-pyrrolidone).

10. A method for transporting a fluid stream, the method comprising:

(a) providing a fluid stream;

(b) flowing said fluid stream from a first location to a second location that is distant from said first location under conditions at which it is thought that clathrate hydrate masses could exist in said fluid stream, said clathrate hydrate masses comprising water and at least one guest molecule; and (C) contacting said fluid stream with an additive for the purpose of preventing clathrate hydrate masses from impeding the flow of said fluid stream, said additive comprising at least one five member cyclic chemical grouping, wherein said additive comprises hydroxyethylcellulose.

11. A method for transporting a fluid stream comprising a continuous aqueous liquid phase having clathrate hydrate masses mixed therein, said method comprising the steps of:

(a) providing a flowable fluid stream comprising a continuous aqueous liquid phase, said continuous aqueous liquid phase having first clathrate hydrate masses mixed therein, each of said clathrate hydrate masses comprising at least one cavity, each of said cavities comprising an ordered arrangement of water molecules that enclose at most one guest molecule, said at most one quest molecule being a molecule other than water;

(b) flowing said fluid stream from a first location to a second location distant from said first location; and (c) contacting said first clathrate hydrate masses mixed in said continuous aqueous liquid phase with an additive to keep said first clathrate hydrate masses dispersed in said aqueous liquid phase thereby preventing said first clathrate hydrate masses from forming a second clathrate hydrate mass that could impede the flow of said fluid stream between said first location and said second location, wherein said additive comprises poly(N-vinyl-2-pyrrolidone).

12. A method for transporting a fluid stream comprising a continuous aqueous liquid phase having clathrate hydrate masses mixed therein, said method comprising the steps of:
   (a) providing a flowable fluid stream comprising a continuous aqueous liquid phase, said continuous aqueous liquid phase having first clathrate hydrate masses mixed therein, each of said clathrate hydrate masses comprising at least one cavity, each of said cavities comprising an ordered arrangement of water molecules that enclose at most one quest molecule, said at most one guest molecule being a molecule other than water;
   (b) flowing said fluid stream from a first location to a second location distant from said first location; and
   (c) contacting said first clathrate hydrate masses mixed in said continuous aqueous liquid phase with an additive to keep said first clathrate hydrate masses dispersed in said aqueous liquid phase thereby preventing said first clathrate hydrate masses from forming a second clathrate hydrate mass that could impede the flow of said fluid stream between said first location and said second location, wherein said additive comprises hydroxyethylcellulose.

13. A method for transporting a fluid stream comprising clathrate hydrate masses, the method comprising the steps of:
   (a) providing a flowable fluid stream comprising a first fluid phase comprising a gaseous phase comprising guest molecules selected from the group consisting of methane, ethane, propane, isobutane, normal butane, nitrogen, carbon dioxide, hydrogen sulfide and combinations thereof and a second fluid phase comprising aqueous liquid;
   (b) adding to said fluid stream an additive selected from the group consisting of poly(N-vinyl-2-pyrrolidone), hydroxyethylcellulose, and combinations thereof;
   (c) flowing said fluid stream and said additive through a conduit from a first location to a second location that is distant from said first location under conditions of temperature and pressure at which first gas hydrate masses are present in said fluid stream, said first gas hydrate masses being mixed in said fluid stream, said first gas hydrate masses comprising at least one of said guest molecules and water, said first gas hydrate masses comprising cavities, each of said cavities comprising an ordered arrangement of water molecules that enclose at most one of said guest molecules; and
   (d) contacting at least a portion of said first clathrate hydrate masses with said additive to prevent said first clathrate hydrate masses from forming a second clathrate hydrate mass that could impede the flow of said fluid stream through said conduit between said first location and said second location.

* * * * *

UNITED STATES PATENT AND TRADEMARK OFFICE
CERTIFICATE OF CORRECTION

PATENT NO.   :   5,420,370
DATED        :   May 30, 1995
INVENTOR(S)  :   Sloan

It is certified that error appears in the above-identified patent and that said Letters Patent is hereby corrected as shown below:

In column 1, immediately following the title, insert the following:

--ACKNOWLEDGEMENT OF GOVERNMENT SUPPORT

This invention was made with Government support under Grant No. DE-FG21-92MC29248 awarded by the Department of Energy. The Government has certain rights in the invention.--

Signed and Sealed this

Twelfth Day of September, 1995

Attest:

BRUCE LEHMAN

*Attesting Officer*    *Commissioner of Patents and Trademarks*